United States Patent [19]

Maurice

[11] Patent Number: 4,851,286
[45] Date of Patent: Jul. 25, 1989

[54] FOAMED PLASTIC CUSHIONING MATERIALS

[75] Inventor: Walter E. Maurice, Spotswood, N.J.

[73] Assignee: United Foam Plastics, Georgetown, Mass.

[21] Appl. No.: 284,776

[22] Filed: Dec. 12, 1988

Related U.S. Application Data

[63] Continuation of Ser. No. 932,652, Nov. 18, 1986, abandoned.

[51] Int. Cl.$^4$ .............................................. B32B 3/26
[52] U.S. Cl. ................................ 428/316.6; 206/523; 206/586; 428/71; 428/76; 428/318.4
[58] Field of Search ................... 206/523, 586; 428/71, 428/76, 81, 83, 314.4, 314.8, 316.6, 317.1, 317.7, 318.4, 319.3, 319.7

[56] References Cited

U.S. PATENT DOCUMENTS

| | | | |
|---|---|---|---|
| 2,860,768 | 11/1958 | Smithers | 206/523 |
| 2,979,246 | 4/1961 | Liebeskind | 206/523 |
| 3,120,319 | 2/1964 | Buddrus | 206/523 |
| 3,138,248 | 6/1964 | Abbott | 206/522 |
| 3,344,973 | 10/1967 | Studen | 206/523 |
| 3,607,601 | 9/1971 | Milam Jr. et al. | 428/316.6 |
| 4,053,341 | 10/1977 | Kleiner et al. | 428/316.6 |
| 4,075,717 | 2/1978 | Lemelson | 2/412 |
| 4,413,735 | 11/1983 | Little | 206/523 |
| 4,721,643 | 1/1988 | Harayama et al. | 428/316.6 |

FOREIGN PATENT DOCUMENTS

| | | | |
|---|---|---|---|
| 1362035 | 4/1964 | France | 428/316.6 |
| 1294606 | 11/1972 | United Kingdom | 428/316.6 |

*Primary Examiner*—William J. Van Balen
*Attorney, Agent, or Firm*—Lahive & Cockfield

[57] ABSTRACT

An improved cushioning element for placement between an impacting surface and a surface of an object to be cushioned against damage caused by impact during transport or storage, comprising: a foamed polymeric laminate comprising a first cushioning layer of a first polymeric foam material having a first density adhered directly to a second cushioning layer of a second polymeric foam material having a different, second density; a first planar, rigid, backing adhered to and in contact with one surface of said foamed polymeric laminate and a second planar, rigid, backing adhered to and in contact with a surface of said foamed polymeric laminate opposite said one surface, said one surface and opposite surface being parallel to each other, and said first and second polymeric foam materials being adhered in a plane substantially parallel to said one and opposite surfaces.

3 Claims, 3 Drawing Sheets

FOAMED PLASTIC CUSHIONING MATERIALS

BACKGROUND OF THE INVENTION

This application is a continuation of application Ser. No. 932,652, filed Nov. 18, 1986, now abandoned.

This invention relates to a method and a family of devices for protecting fragile articles against impact damage. More particularly, it relates to foamed plastic laminates comprising adhered foamed materials of differing densities which display synergistic cushioning properties.

Fragile articles such as electronic, electromechanical, and optical equipment have been protected during shipment and storage by exploiting the cushioning properties of foamed plastic materials. Such cushioning devices have taken various forms. For example, interfitting foamed plastic blocks defining an interior shape which cradles a lens, clock, or the like are in wide use. Fragile articles such as glassware is often transported within a volume of foamed plastic chips. Machinery such as electronic printers, computers, disk drives and the like is often packaged in a double box arrangement wherein blocks of foam are used to fill in empty space and cavities in the exterior shape of the equipment before the equipment boxed, and then foamed plastic corner, edge, and side blocks are disposed between the box and an outer carton to protect the equipment from impact damage during handling. For heavier fragile equipment, pallet cushions are often used. These comprise a thickness of foamed polymer sandwiched between and adhered to a pair of parallel plates, typically of plywood. The pallet cushions are used, for example, by placing one in each corner of a pallet designed for use with a lift truck, and then placing a load bearing surface of the equipment directly on the four pallet cushions. The equipment is then tied to the pallet using straps or the like. The cushions serve to protect the equipment from impacts caused, for example, by dropping the pallet.

When an article is dropped, it decelerates over a short distance at the point of impact, often subjecting the object to a G force of sufficient magnitude to damage it. Abrupt loss of velocity at impact with an immovable surface can generate surprising high instantaneous forces, on the order of hundreds or even thousands times gravity. The purpose of cushioning is to reduce the rate of deceleration enough to minimize or prevent damages.

The advantages of using foamed plastic materials for such cushioning applications are well recognized. Polyolefin, Polyurethane, and other types of foamed polymers, both of the open-cell and closed-cell variety, have been used in various applications. Generally, foam plastic materials are lightweight and relatively inexpensive, and typically are supplied in a variety of densities. Foamed Plastic materials generally are shatter resistant and can be engineered to resist breakage and crumbling when flexed, cut, or struck. They display generally excellent recovery from shock or strain and return to shape quickly after impact. They are also generally resistant to chemical attack and moderate temperature extremes, and they often can serve to protect the product from air, water, or dust.

Those responsible for preparing fragile articles for shipment or storage have developed methods for determining with significant precision the thickness, density, and amount of foam necessary to provide adequate impact protection to a given object. These methods take into account the objects weight, fragility, and the way it is likely to be handled during shipment. To establish the amount of cushioning required, the product's fragility factor (expressed in G's) is first determined. This measurement is based on the maximum deceleration the product can withstand without damage. The ratio of this maximum safe deceleration to the acceleration of gravity is the fragility factor of the product, and is commonly referred to as the "G" factor. For example, very fragile electronics systems and precision test instruments typically have a G factor of 15 to 25; shock mounted instruments and electronic equipment have G factors within the range of 25 to 40. Cash registers, office equipment, and the like are in the 40 to 60 range, television receivers are typically in the 60 to 85 range, and major appliances in the 85 to 115 range.

To determine the amount, thickness, and density of a given foam plastic material needed to protect the Product from impact caused by inadvertent dropping during handling, it is also necessary to assess what the most likely drop height of the piece of equipment involved might be. For example, a package weighing less than 20 pounds might be thrown by a handler and might experience a drop of four feet or more onto a hard surface, whereas a heavy piece of equipment typically handled by a lift truck would be unlikely to be dropped more than about one foot.

Reference is then made to deceleration-load curves for various types of foam plastic products. Such curves are supplied by manufacturers of foam stock as performance data. They also can be determined using known standardized testing procedures. Typically, these curves comprise graphs of average faired peak deceleration in G's versus static loading in pounds Per square inch (psi), and set forth the relationship of these variables for a given drop height and a given foam thickness for a given foam material.

An example of such a graph is shown in FIG. 1, which discloses the relationship of average faired peak deceleration and static loading for 5, 4, 3, 2, and 1 inch of expanded polyethylene foam having a nominal density of 2.2 pounds per cubic foot (pcf).

Curves such as depicted in FIG. 1 may be used to determine proper cushioning. For example, if the object to be packaged is a 10 inch cube weighing 60 pounds, the anticipated drop height is 24 inches, and the object's fragility factor is 50 G's, the minimum thickness of cushioning material needed to protect the product effectively can be determined as follows. The 50 G mark on the ordinate intersects the curves for 5 inch, 4 inch, and 3 inch foams, and intersects the 2 inch foam curve twice. For economic reasons, the minimum thickness that will cushion the product effectively is normally used. In this case, 1 inch thick foam would be inadequate in all cases, but it would be possible to use 2, 3, 4, or 5 inch foams.

To determine what area of foam of a given thickness should be used to adequately protect the product, one reads the abscissa which indicates that, for a 2 inch thickness, a static loading between about, 0.3 to about 1.4 psi will be adequate. The area of foam needed is then determined by dividing the weight of the object by the static loading value. In this instance, the 60 pound object can be adequately protected by interposing between 43 (60/1.4) and 200 (60/0.3) square inches of 2 inch foam on each side of the object.

To avoid buckling, that is, compression of the foam over too small a bearing area during impact, a rule of thumb may be used that states a cushion will not buckle if its minimum area equals or exceeds the square of 1.33 time the thickness in inches of the cushioning material. Accordingly, in this exemplary calculation, the minimum area needed to avoid buckling would be $(1.33 \times 2)^2$ or about 7 square inches. Thus, any bearing area larger than about 7 square inches could normally be used without fear of buckling. Adequate cushioning could be accomplished by interposing between the object and an impacting surface one or several 2 inch thick foam pieces having a total area in excess of 43 in.$^2$ and less than 200 in.$^2$, provided any given piece has an area greater than 7 square inches. For light equipment, the cushioning should be disposed on all sides. With heavier equipment which in transport and storage is maintained in an upright Position, only the load bearing surface must be cushioned.

The development of the foregoing technology has enabled those skilled in the art to design cushioning packages for any given fragile object using adequate but not wasteful amounts of foam plastic material. Intelligent design of such cushioning Packages has significant economic consequences as it permits design of the smallest possible package which will Protect the object, and thus enables the manufacturer to reduce shipping costs while adequately protecting the goods from damage. Both shipping and material costs are reduced as the weight and volume of the package are reduced.

SUMMARY OF THE INVENTION

It has now been discovered that laminates of two or more foamed polymeric materials having differing densities unexpectedly exhibit synergistic cushioning properties. More specifically, it has been discovered that the ratio of average faired peak deceleration to static loading for a foam laminate of a given thickness is lower, and in many cases very significantly lower, than the same ratio for a homogeneous foam material of the same thickness having a density equal to either of the materials of the laminate.

This discovery has enabled the development of an improved method for protecting an object against damage caused by impact. Broadly, the method comprises the step of interposing between at least one surface of the object and an impacting surface, a foamed polymeric cushioning element comprising a laminate. The laminate comprises a first polymeric foam material having a first density adhered to a second polymeric foam material having a second density different from the first. When the novel cushioning element is disposed with the plane of lamination substantially parallel to the surface of the object to be protected, synergistic cushioning properties are observed. More particularly, such elements are characterized by the property of reducing force applied to the object on impact relative to otherwise identical foam cushioning elements comprising only a single foamed material of either the first or second density. Stated differently, such laminates are characterized by lower ratios of deceleration protection to static loading.

In preferred embodiments, the first and second polymeric foam materials have densities with the range of 0.5-10 pcf; at least one of the laminated foamed materials is a closed cell foam, the ratio the densities of the materials is at least 0.66; and at least one of the foamed materials comprising a polyolefin. Such cushioning elements may be used in conjunction with one or two planar rigid backings such as a carton which envelops the object or a rigid plate to form a pallet cushion. The cushioning element may be adhered to one or more of the backings.

In another aspect, the invention provides a cushioning element comprising a first polymeric foam material having a first density adhered to a second polymeric foam material having a different, second density to produce a laminate characterized by synergistic cushioning properties. Backing or support materials may be used in contact with the surfaces of the laminate and may be adhered thereto in appropriate circumstances. In one embodiment, the invention takes the form of an improved package comprising a cushioning element interposed between an inner and outer carton.

In another embodiment, it comprises a pallet cushion consisting of a laminate sandwiched between a pair of adhered Parallel rigid plates such as plywood or wafer board. In one preferred embodiment of the pallet cushion, the area of the foamed laminate adhered to the parallel support plates is less than the area of the plates, and the laminate has a cross-sectional shape in the plane parallel to the plates defining a central core and radiating spokes.

In another embodiment, the cushioning element takes the form of a corner block defining three orthogonal surfaces for placement on an outside corner of the object to be protected, or on a carton or other package housing the object. For maximum cushioning, the plane of lamination of the foam stock from which the block is made is parallel to at least one, and preferably all three of the orthogonal surfaces. The cushioning element of the invention also may take the form of an edge block of similar construction comprising a pair of perpendicularly arranged surfaces. Also, arcuate laminates having a plane of lamination corresponding substantially to a concave arcuate surface designed to contact a curved surface of an object to be cushioned are within the scope of the invention.

In still another embodiment, the cushioning element takes the form of first and second mating sections which when mated define a cavity for holding an object to be cushioned. At least one of the mating sections comprises a laminate of the type described above, and preferably is designed such that all lines between the cavity and the outside surface of the container pass through a laminated interface.

Use of cushioning elements embodying the invention enables the design of more compact packages than have heretofor been possible using foamed plastic cushioning materials while nevertheless providing the same cushioning properties thereby significantly reducing materials, shipping, and storage costs. Alternatively, the cushioning elements of the invention enable one to increase the margin of safety on impact of fragile articles protected by a cushioning material of a given thickness, thus providing additional protection in a package of the same size.

Accordingly, it is an object of the invention to provide methods of cushioning fragile articles characterized by more efficient use of foam plastic stock, to reduce the volume of cushioning needed to protect a given article against impact damage, and to improve the margin of safety of cushioned packages of a given size. Another object is to provide an inexpensive method of protecting fragile articles from impact damage during transport and storage. These and other objects and features of the invention will be apparent from the following description, the drawing, and the claims.

BRIEF DESCRIPTION OF THE DRAWING

FIG. 2 compares the ratio of average faired deceleration to static loading for a 2 inch thickness of 2.2 pcf polyethylene foam, a 2 inch thickness of 4 pcf polyethylene foam, and a 2 inch thickness of a cushioning element embodying the invention comprising a laminate of 1 inch of the 2.2 pcf and 1 inch of the 4 pcf foams;

DESCRIPTION

It has now been discovered that a laminate of two foam plastic materials having differing densities has synergistic cushioning properties. That is, a laminate of a given thickness comprising two or more sheets of foamed polymeric material having differing densities is more effective in absorbing force cause by impact than a single piece of equal thickness of either of the individual foams from which the laminate is constructed. This discovery makes possible the fabrication of various types of cushioning structures having significantly improved cushioning properties as compared with the structures of the prior art. Examples of such structures, all of which comprise embodiments of the invention, are described in detail below.

Figure 1:
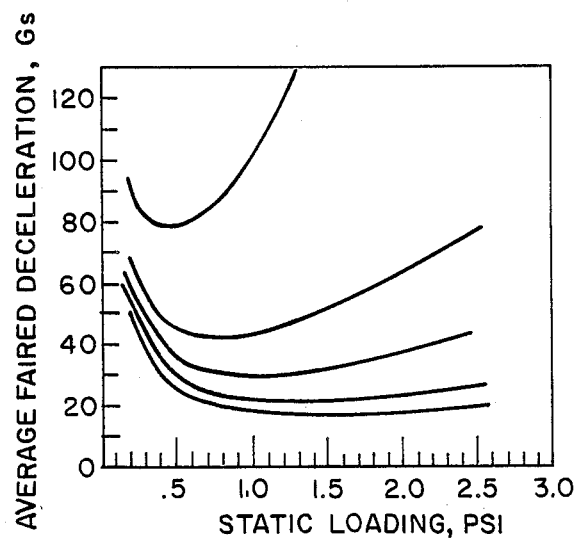
FIG. 1 is a graph of average faired deceleration (drops 2 through 5, in G's) versus static loading for 1, 2, 3, 4 and 5 inch thick foams having a nominal density of 2.2 pcf. The graph may be used to determine the amount of foam material needed to protect an article from 2 to 5 impacts on a 24 inch drop for various static loads.
Figure 2:
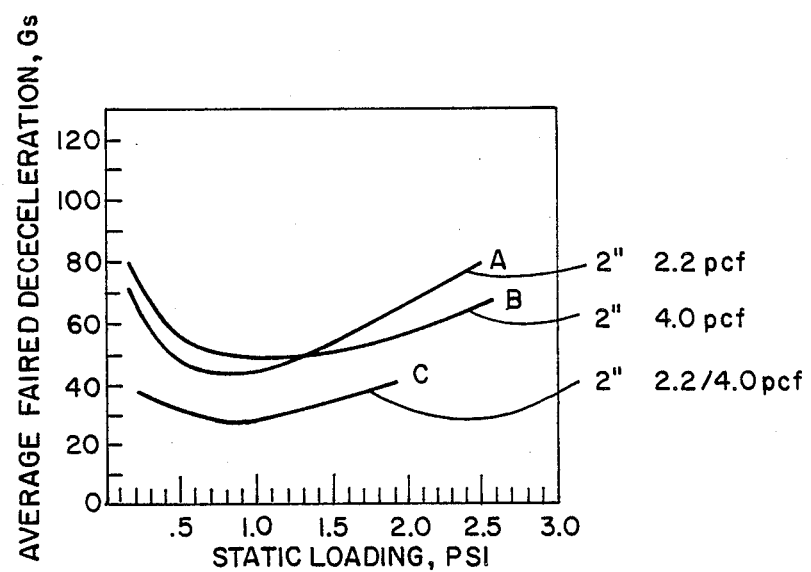
FIG. 2 is a graph similar to FIG. 1 illustrating the improved properties of a cushioning element of the invention.

Referring to FIG. 2, an example of the synergistic properties of the improved cushioning element of the invention is illustrated. FIG. 2 shows the relationship of average faired deceleration in G's versus static loading for three, 2 inch thick foam materials. Curve A shows the relationship for a polyolefin foam having a 2.2 pcf density; curve B shows the relationship for a polyolefin foam having a 4 pcf density; and curve C shows the relationship of a laminate comprising 1 inch of the 2.2 pcf foam and 1 inch of the 4.0 pcf foam. As illustrated, the entirety of the curve in the static loading range measured lies well below the curve for either of the components of the laminate, even though all three foamed plastic cushioning elements are of the same thickness. This means that the laminated cushioning material absorbs impact better than the homogeneous materials. This unexpected improvement in cushioning properties has been observed with all bilayered foam laminates tested to date. Trilayered laminates also show unexpectedly good cushioning properties. In some cases, depending on the density of the materials selected, the curves may intersect at some levels of static loading.

The preferred laminating method used for fabricating the cushioning elements is to apply heat to the surfaces of the two materials to be adhered so that surface layers become slightly fluid or tacky. The two foam layers are then pressed together until their interface is cool to Produce a bond uniformly over the interface area. When at least one of the laminated foam materials comprises a non-thermoplastic polymer, various conventional adhesives may be used to bond the laminated interface. Such stock may then be cut, sawed, shaped, molded, assembled into various structures, and otherwise fabricated using conventional techniques to produce desired shapes useful in particular cushioning applications. The foams for use in the invention comprise semi-rigid, resilient, open, or closed celled, or filled foams ranging in density from about 0.5 to 10 pcf. Foams made from thermoplastic resins currently are preferred, although thermosetting resin foams may also be used.

The components of the laminate may comprise foams made from polyimides, polyolefins such as polypropylene and polyethylene, polyamides, polyvinyl chloride, polyurethanes, including ester and ether types and various hybrids thereof, and synthetic rubber-like foams such as polydienes. Foams containing fillers or so called "loaded foams" may also be used.

Preferably, the ratio of the densities of the two foams is at least 0.66. As the densities of the foam layers of the laminate approach each other, the cushioning properties of the laminate approach those of a single density, homogeneous foam. It is preferred that the interface of the layers of the laminate lie in a plane substantially parallel to the surface of the object to be Protected. Maximum cushioning properties are observed when the impact is directed perpendicular to the lamination interface.

In the practice of the invention, a series of laminates constructed in accordance with the teachings above are prepared, static loading curves for each of the laminates similar to curve C of FIG. 2 are derived, using, for example, a cushion tester such as the device sold commercially by Lansmont Corp. (Pac. Grove Calif.), in accordance with ASTM stand D-1596-78a as described therein. The laminates are then used in a way similar to the homogeneous foams used for the same purpose in the prior art. Advantageously, because of the inherent improved cushioning properties of the laminates, substitution of a given thickness and area of the laminated cushioning material for homogeneous foamed material provides significantly increased levels of protection to a given package. Also, an object of a given weight, dimensions, and fragility can be packaged using the laminates constructed in accordance with the teaching herein in a significantl'y smaller volume than prior art packages, yet will afford identical protection. In this regard it should be noted that the reduction in volume of the package is a function of the cube of the reduction in thickness of the foam packaging material.

Figure 3:
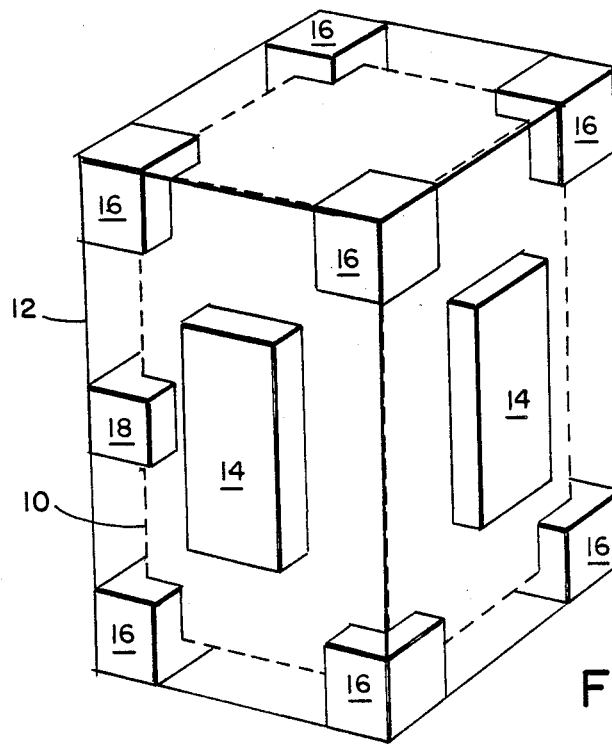
FIG. 3 depicts a cushioning package embodying the invention.

One exemplary use of the cushioning material of this invention is depicted in FIG. 3, which shows a perspective view, partially in phantom, of a double-layered package of the type commonly used to protect fragile electronic equipment. As illustrated, the package comprises a first backing comprising an inner box 10 made, for example, of cardboard which envelops the object to be protected (not shown) and a second backing comprising an outer box 12. Disposed between the boxes are surface cushioning elements 14, corner block cushioning elements 16, and edge cushioning elements 18. The package differs from packaging of the prior art in that the foamed plastic cushioning elements 14, 16, and 18 are fabricated from the foam laminates described above.

Figure 6:
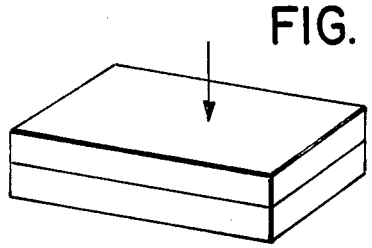

Of course, the particular shape of cushioning elements constructed in accordance with the invention will be dictated by the particular package involved. Details of the structure of the elements illustrated at 14, 16, and 18 are depicted in FIGS. 4–6.

Figure 4:
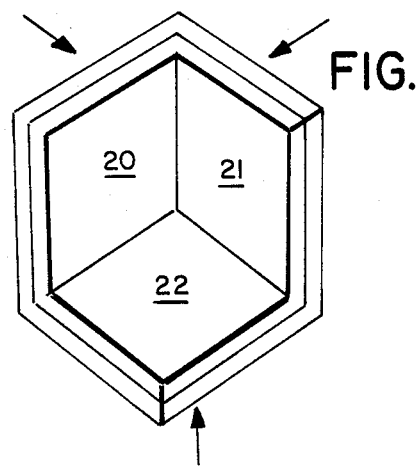
FIGS. 4-6 depict various embodiments of foam cushioning elements of the invention useful in constructing the package of FIG. 3.
Figure 5:
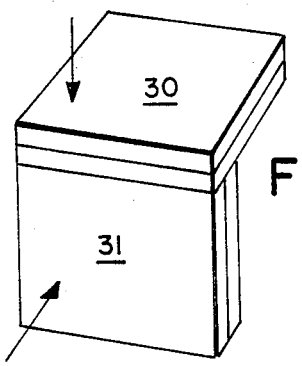

FIG. 4 shows a perspective view of a corner block embodying the invention. It comprises three orthogonally arranged blocks 20, 21, and 22, each of which consists of a laminate of two foams having different densities. FIG. 5 depicts an edge block comprising two pieces of foam 30 and 31, each of which comprises a laminate of a type described above, fixed perpendicular to each other. FIG. 6 depicts a surface block, again comprising a laminate of two foams of differing densities.

Figure 7:
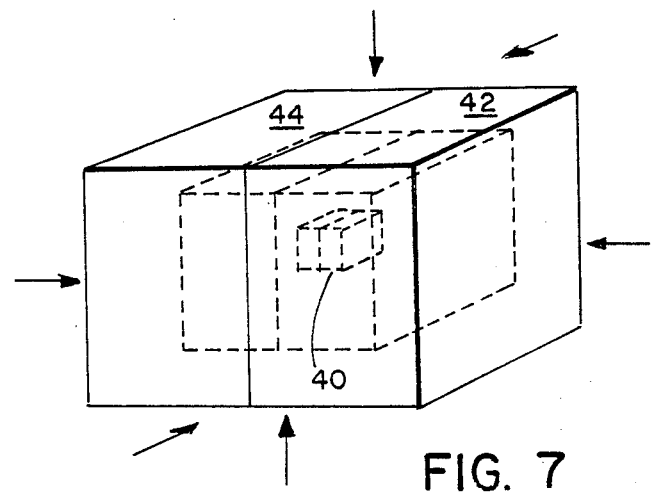
FIGS. 7 and 8 depict a second type of cushioning package embodying the invention.
Figure 9:
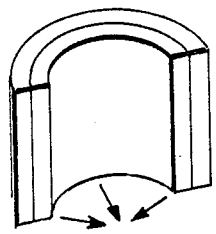
FIG. 9 depicts an arcuate cushioning element embodying the invention.
Figure 8:
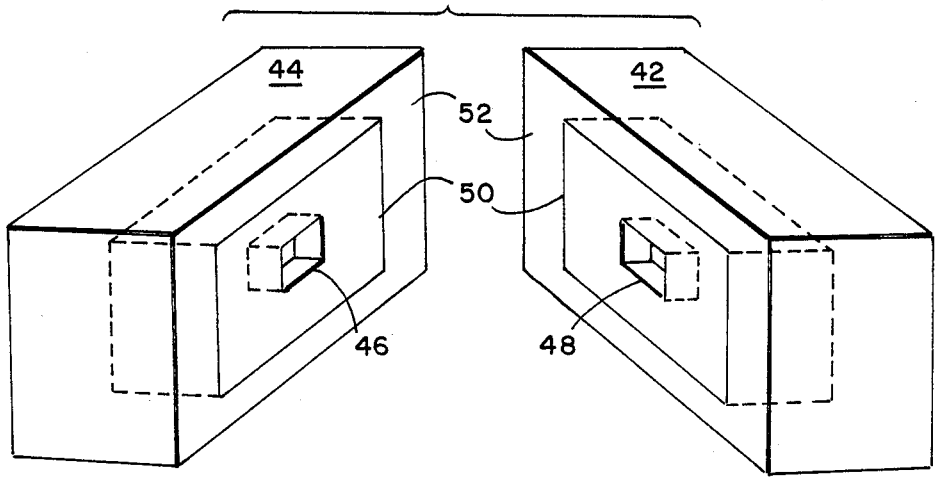

FIGS. 7 and 8 depict a customized package constructed in accordance with the invention for protecting a fragile cube 40. It comprises two mating halves 42, 44 each of which have centrally located mating recesses 46, 48, an inner layer of foamed polymeric material of a first density 50, and an outer layer of a foamed polymeric material having a different density 52. The sections 42 and 44 are mated together as shown in FIG. 7 to provide complete protection for the fragile cube 40. 'The arrows in FIGS. 4–9 indicate generally the direction in which each of the respective embodiments of the cushioning element are most effective in absorbing impact force. The dashed lines depict the laminated interface.

Figure 10:
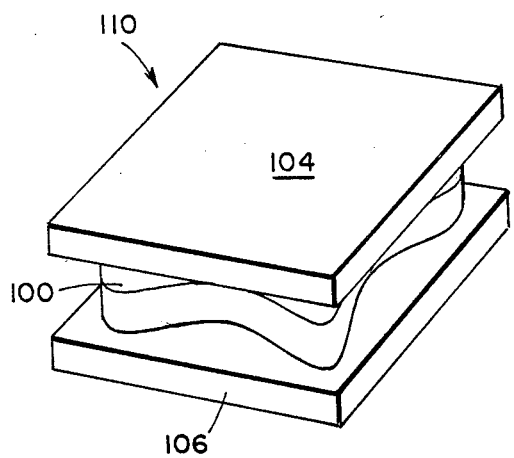
FIGS. 10 and 11 depict a perspective view and a cross-sectional view, respectively, of a pallet cushion embodying the invention.
Figure 11:
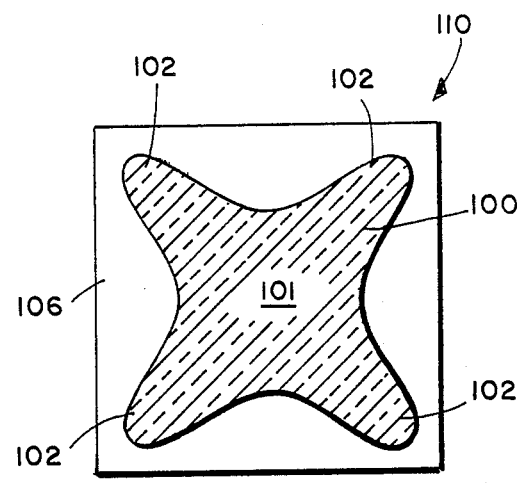

FIGS. 10 and 11 illustrate a pallet cushion embodying the invention. The pallet cushion 110 comprises a laminate 100 of foam plastic material comprising a central portion 101 and radiating spokes 102. The laminate is adhered to and sandwiched between a pair of rigid, planar backing plates 104 and 106. The backing plates may be cut from essentially any rigid stock, e.g., plywood, and adhered to the foam cushioning element 100 by any conventional means. While cushioning element 100 of pallet cushion 110 generally may take any desired cross-sectional shape, a shape comprises a central core portion and radiating spokes is preferred for providing lateral stability on impact.

The invention may be embodied in other specific forms without departing from the spirit and scope thereof. Accordingly, other embodiments are within the following claims.

What is claimed is:

1. An improved cushioning element for placement between an impacting surface and a surface of an object to be cushioned against damage caused by impact during transport or storage, comprising:

a foamed polymeric laminate comprising a first cushioning layer of a first polymeric foam material having a first density adhered directly to a second cushioning layer of a second polymeric foam material having a different, second density;

a first planar, rigid, backing adhered to and in contact with one surface of said foamed polymeric laminate; and a second planar, rigid, backing adhered to and in contact with a surface of said foamed polymeric laminate opposite said one surface, said one surface and opposite surface being parallel to each other, and said first and second polymeric foam materials being adhered in a plane substantially parallel to said one and opposite surfaces;

whereby said first and second backings sandwich said foamed polymeric laminate, said first planar, rigid, backing accommodates an impacting surface, said second planar, rigid, backing accommodates a load bearing surface of said object, and said element is characterized by the property of reducing force applied to said object on impact relative to an otherwise identical element comprising a single foam polymeric material of either said first or second density.

2. The improvement of claim 1 wherein the area of said foamed polymeric laminate adhered to said backing is less than the area of said backing.

3. The improvement of claim 2 wherein said foamed polymeric laminate has a cross-sectional shape in a plane parallel to the plane of said backing defining a central core and radiating spokes.

* * * * *